United States Patent [19]
Chaplin

[11] Patent Number: 4,516,720
[45] Date of Patent: May 14, 1985

[54] AUTOMATIC TEMPERATURE ADJUSTMENT APPARATUS

[76] Inventor: James E. Chaplin, 66 Overlook Rd., Bloomingdale, N.J. 07403

[21] Appl. No.: 518,118

[22] Filed: Jul. 28, 1983

[51] Int. Cl.³ .............................................. F24D 3/00
[52] U.S. Cl. ................................. 237/8 R; 236/46 R; 236/91 F
[58] Field of Search ................ 236/91 F, 46 R, 91 R, 236/91 G; 165/12; 364/557, 505; 237/8 R

[56] References Cited
U.S. PATENT DOCUMENTS

4,290,551 9/1981 Johnstone .......................... 237/8 R
4,298,943 11/1981 Tompson ........................... 236/91 F
4,410,132 10/1983 Levine .............................. 236/46 R Primary Examiner—William E. Wayner

[57] ABSTRACT

An apparatus for increasing the efficiency of a conventional central space heating system is disclosed. The temperature of a fluid heating medium is adjusted based on a measurement of the external temperature, and a system parameter. The system parameter is periodically modified based on a closed loop process that monitors the operation of the heating system. This closed loop process provides a heating medium temperature value that is very near the optimum for energy efficiency.

10 Claims, 7 Drawing Figures

AUTOMATIC TEMPERATURE ADJUSTMENT APPARATUS

The U.S. Government has a paid-up license in this invention and the right in limited circumstances to require the patent owner to license others on reasonable terms as provided by the terms of Grant no. DE-EG42-81R205259 awarded by the Department of Energy.

BACKGROUND OF THE INVENTION

The present invention relates to apparatus used to increase the efficiency of space heating systems by adjusting said heating system's operation based on a measurement of the conditions external to said space being heated.

Small scale heating systems (residential and most commercial), use conventional control systems with essentially no processing. For example, a conventional residential fossil fuel fired hydronic heating system operates by a simple on/off thermostat switch. The water temperature, then, must be set high enough to provide sufficient heating output under the worst case ambient temperature, say, $-10°$ F. When the ambient temperature is higher, the required BTU output is less, and the water temperature could be lowered, providing an energy savings through reduced standby and heat-up losses. Without some form of processing, however, this system must always run at maximum water temperature.

One concept that has been effectively applied to small heating systems is the reset principle. Systems which use said principle incorporate a temperature sensing device mounted externally to the structure being heated, to provide a measure of the external ambient temperature. The external temperature reading is used, based on a preset ratio of external ambient to heating system (furnace) temperature and heating system reference temperature, to adjust (i.e., reset) the temperature of the heating system fluid (usually water or air) for better heating system efficiency. Such systems are available commercially as additions to conventional heating system controllers, and many devices using variations on the application of the reset principle have had U.S. Patents granted. Whereas such systems are undoubtedly more energy efficient than simple conventional controllers, they cannot approach the efficiency of what we shall call herein an "ideal Reset" system due to the fact that they employ an open-loop temperature adjustment operation.

The Reset principle, as implemented in current systems and in prior U.S. Patent art, only accounts for one variable in the determination of a structure's heating load, albeit a primary one, external temperature. The external temperature determined from the system's sensor is used to automatically adjust the set temperature of the heating system's fluid (i.e., water) in order to minimize the operating temperature of the heating system in accordance with the heating load as determined by the external temperature. This, in turn, minimizes incidental heat loss at the heating system's furnace, providing an overall increase in the efficiency of the heating system.

Such implementation, however, does not account for other variables in the determination of heat load, such as wind, solar heating, and variations in structure insulation (e.g., removal or installation of storm windows, leaving a window open, etc.). The "ideal Reset" system is one that accounts for all variables in heating load determination in the process of computing the reset value for the heating system. Having accounted for all variables, the ideal Reset system will cause the fluid temperature of the heating system to be maintained at the most efficient, i.e. minimum, temperature possible for the present ambient conditions. This most efficient condition will manifest itself with the effect of the heating system operating (i.e., fluid circulating to the devices creating the exchange of heat) exactly 100% of the time, except when the external temperature is at or above the internal temperature of the structure. Due to the fact that the current Reset system implementations do not account for all variables, they must be set to operate with sufficient heat output to handle the worst case environmental conditions for a specific ambient temperature. Thus, such systems will generally not run at optimum efficiency, except for the infrequent situation where all worst-case conditions are met.

One other drawback to the currently available Reset systems is that manual adjustment of at least two parameters is required, either by the user or an installation technician, in order to put the device into service. These parameters are the Reset Ratio and the Reference Set Point. The Reset Ratio determines the ratio of the change in heating system fluid temperature that will be caused by a change in external ambient temperature. The Reference Set Point is usually selected as the Initial Set Point, that is, the heating system fluid temperature desired when the external ambient temperature is equal to the internal temperature (usually 70° F.). The Reset Ratio is a very difficult parameter to determine, since it is based on factors such as heating system design, effective insulation of the structure, prevailing winds and exposure to the sun. This parameter can only be accurately determined by an expert versed in heating system design, insulation of structures, and other environmental effects on heat transfer. This parameter selection process is further complicated by the fact that in order to obtain an optimum reset curve at lower external temperatures, where heating is critical, the Initial Set Point may have to be modified from a simple nominal value. Finally, the selection of these parameters at the initial installation may be invalidated by subsequent modifications made by the structure owner, such as the installation of storm windows or added insulation.

SUMMARY OF THE INVENTION

The present invention approximates an "ideal Reset" system by using a closed loop operation that automatically adjusts the operating parameter of a heating control system utilizing the reset principle. The present invention obtains an efficiency that approaches the ideal Reset system, and is thus substantially improved over the currently available Reset systems. Because of its closed loop operation, the present invention requires only an approximate setting of a single parameter at initial installation, which can be substantially in error without affecting heating system operation, since the parameter will be automatically adjusted by the present invention (hereinafter referred to as the invention) during normal operation.

The objective of the invention is to minimize the standby heat losses of a heating system (e.g., hot water baseboard) by reducing the heating system fluid temperature to the lowest level possible with the current external ambient temperature. Reducing said fluid temperature results in a reduction of heat energy lost to said heating system's surroundings. The computation and control of said fluid temperature is handled by heating system controller.

The invention accomplishes said minimization of heat losses by measuring the current ambient temperature external to a structure and using said measurement to adjust the fluid temperature of a heating system used to maintain the interior temperature of the structure at a manually selected value by generating and distributing heat within the structure as determined to be required by a sensing device that is part of the heating system, such as a thermostat. The heating system itself consists of a simple on/off sensing element, or thermostat, used to provide a call for heat signal to the remainder of the heating system when the interior temperature of the structure falls below a temperature limit that is manually selectable at the thermostat, means for heating and distributing a fluid to heat radiating elements within the structure under the control of the thermostat, and means for allowing signals external to the heating system to control the temperature of the heating system fluid. Said heat loss minimization is herein referred to as the reset principle, and is used in currently available commercial products.

In addition to the implementation of said reset principle, the invention incorporates a unique automatic closed loop measurement and adjustment process, herein referred to as the parameter adjustment process, that allows the temperature of the heating system fluid to be set to a value that is very near the most efficient that can be attained with a perfect system using the reset principle. To perform said parameter adjustment process, the invention measures the percentage of time that a call for heat signal is active at the heating system's temperature sensing element, or thermostat. If the value that the system using the reset principle (hereinafter referred to as a reset system) had selected for the heating system's fluid temperature was one providing optimum efficiency, that is, a perfect value, then the interior temperature of the structure would maintain a steady value without fluctuation, and the heating system would remain on 100% of the time. This is an ideal condition in which the heating system fluid is being maintained at the absolute lowest value possible while still providing sufficient heat output to maintain the selected temperature level within the structure, resulting in the optimum efficiency that can be obtained from a reset system. Since it is not possible to obtain any useful information from a measurement of 100%, the invention uses the said measurement of percentage of time of call for heat to adjust the temperature of the heating system fluid in order to obtain a percentage of call for heat that is nearly, but not exactly, 100% (90-95% is a practical range of values). Exactly 100% cannot be used because there is no way for the measuring system to distinguish between 100% and greater than 100% based only on a measurement of time that the signal is active.

BRIEF DESCRIPTION OF THE DRAWING FIGURES

The above described invention is set forth in more detail in the following detailed description and in the accompanying drawing figures, of which.

DETAILED DESCRIPTION OF THE INVENTION

Although many other embodiments of the invention are possible, the specific preferred embodiment discussed herein utilizes a microprocessor or microcomputer system (hereinafter referred to as a microcomputer) for performing control and computation functions. These devices have been selected because of their low cost, ease of modifying operation through software programming, and the ability to incorporate other processing functions beyond the scope of the invention, which may serve to increase marketability and/or maintainability (e.g., built-in test).

Figure 1:
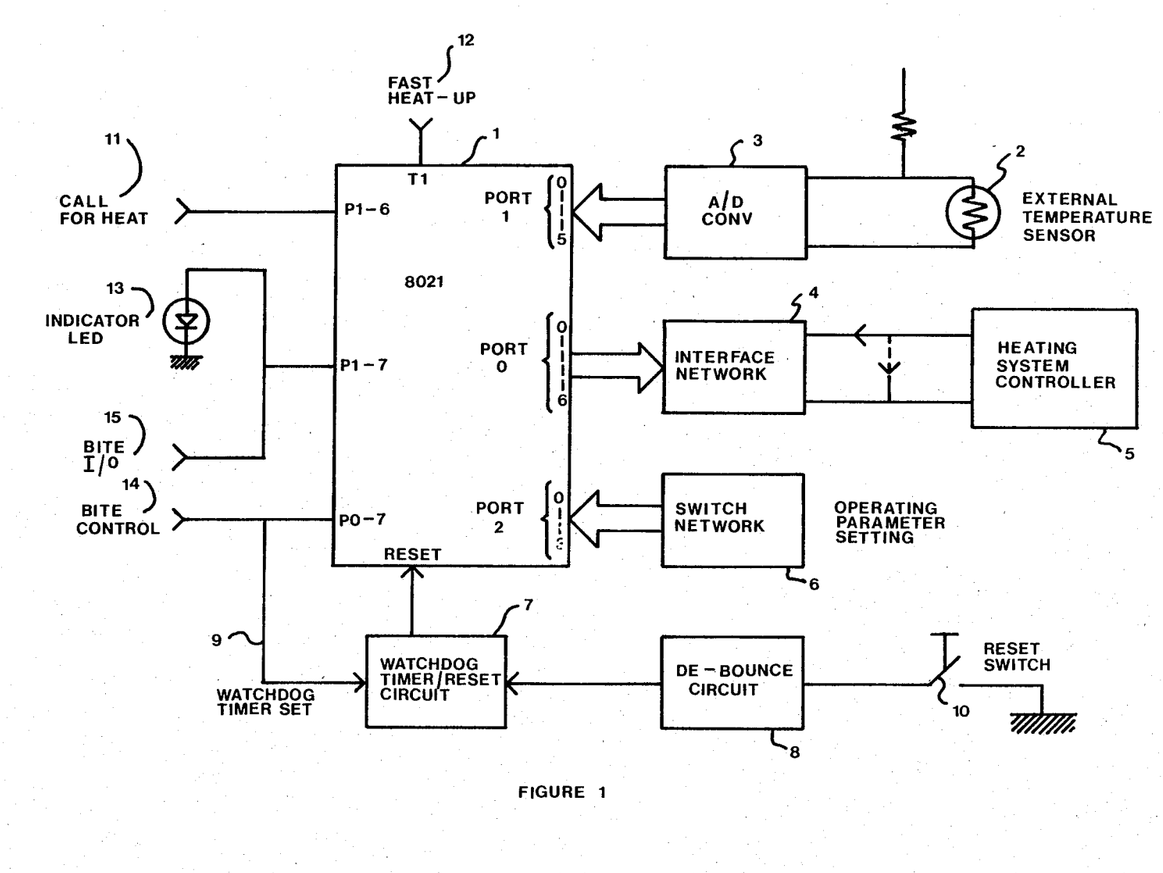
FIG. 1 is a block diagram of the hardware elements comprising the preferred embodiment of the invention.

A block diagram of the preferred embodiment is shown in FIG. 1. An Intel 8021 microcomputer (1) is used to handle all control and computation functions. The 8021 is a low-cost member of the 8048 8-bit microcomputer family. It contains 1,024 eight-bit words of program memory, and 64 eight-bit words of RAM (random access memory) data memory.

The external temperature sensor (2) provides the input data for the computation of the heating system fluid temperature equation. A linear thermistor composite was chosen for the temperature sensing instead of a thermocouple because of its reliability and wide output range to the A/D (analog to digital) converter (3). The thermistor output is adjusted to range within one quadrant of the 8-bit A/D (3) for the expected ambient temperature range. The resulting 6 LSB's (least significant bits) of the A/D (3) provides a resolution of 2° F. The digital output of the A/D (3) is connected to the microcomputer (1) at I/O Port 1.

The proper heating system fluid temperature, as determined by the process described below, is output at Port O of the microcomputer (1). Seven bits are used, with 2° F. resolution, to cover the required range of heating fluid temperatures. An interface network (4) connects the digital representation of the temperature into an appropriate control signal for use by the Heating System Controller (5). The interface network will be of various designs, depending on the specific controller to which it is being interfaced.

An initial operating parameter setting may be selected by the installation technician using a switch network (6). This may be a set of single pole switches, an encoded digital thumbwheel switch, or the like. The switch settings are sensed at Port 2 of the microcomputer (1) at initial turn-on only. The parameter thus set is then automatically adjusted by the said parameter adjustment process, described in more detail below.

A watchdog timer circuit (7) is included to increase the reliability of the invention. Said circuit expects to receive a Watchdog Timer Set signal (9) from the microcomputer (1) on a periodic basis, which it will receive if the microcomputer (1) is operating properly. If said microcomputer (1) is not operating properly, said signal will not be received, and the watchdog timer circuit (7) will automatically reset the microcomputer (1). A debounce circuit (8) is provided to interface a manual reset switch (10).

Various other control and output signals are provided to the microcomputer (1). A Call for Heat signal (11), which is used in the parameter adjustment process, is input at Port 1-6. A Fast Heat-Up signal (12), which allows the user to call for full heating system output temporarily, is input at the test pin, T1. An indicator L.E.D. (light emitting diode)(13) is connected to Port 1-7 to indicate to the user that the system is operating properly. A control input for built-in test equipment, BITE Control (14) is input at Port 0-7. The microcomputer (1) senses this port to determine if it should accept signals from Port 1-7, BITE I/O (15).

Figure 2:
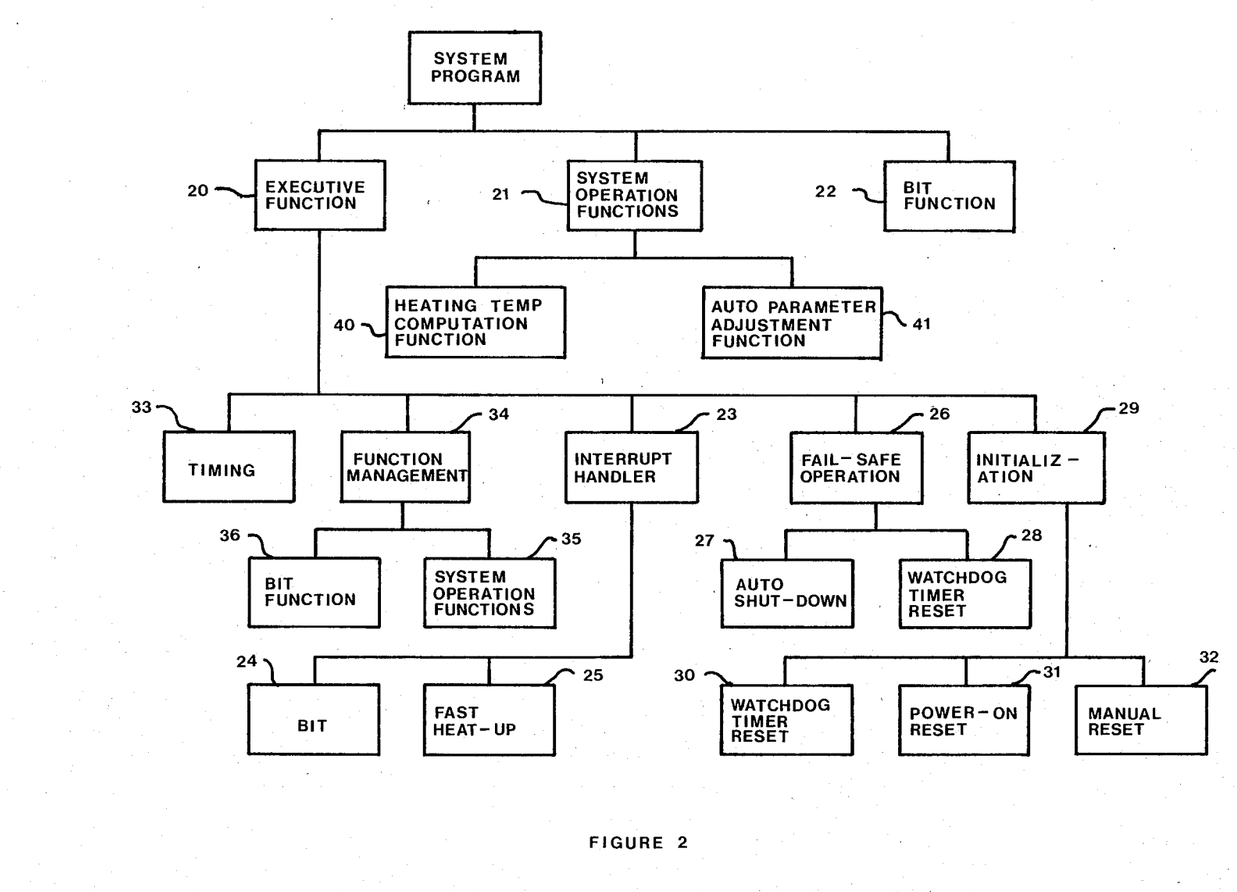
FIG. 2 is a block diagram presenting the architecture of the software program containing the processing and control functions of the invention.

The microcomputer (1) performs its functions by virtue of a software program maintained in its program memory. A block diagram of the software architecture used for the invention is shown in FIG. 2. Overall control and timing of the system processes are handled by an Executive Function (20). It schedules and manages all the system (21) and built-in test (BIT)(22) functions.

Although there are no true interrupts in the 8021, the executive senses interrupt activity such as BIT (24) and Fast Heat-Up (25) by polling the I/O ports. Routines for handling the interrupts are contained in the Executive Function Interrupt Handler (23).

Fail-Safe operation (26) is provided by an Automatic Shut-Down (27) and the Watchdog Timer Reset (28). The Automatic Shut-Down (27) is performed if a failure is detected by BIT that will affect the operation of the invention. The result of this algorithm is to allow the heating system controller to operate normally, as if the processor were disconnected. The Watchdog Timer (28) will simply activate a processor reset.

Initialization (29) is performed following a reset. The reset vectors the program counter to location O. Reset is applied through the reset pin by a Watchdog Timer failure (30), Power turnon (31) or manual reset (32).

All of the subfunctions shown under the Executive are performed within a single routine, designed as a continuous coded program. Various functions are scheduled by the Executive function by using calls to other activities as subroutines.

Initialization (29) is performed at the beginning of the program following a reset, and is not repeated during a normal program cycle until an externally generated reset command is received. This is followed by various timing, scheduling (33) and Function Management operations (34) that coordinate and direct the system functions (35) and BIT (36).

The two System Operation Functions (21) which perform the processes required for the invention, and for which all the other software functions perform a supporting role, are the Heating Temperature Computation Function (40) and the Automatic Parameter Adjustment Function (41).

Figure 3:
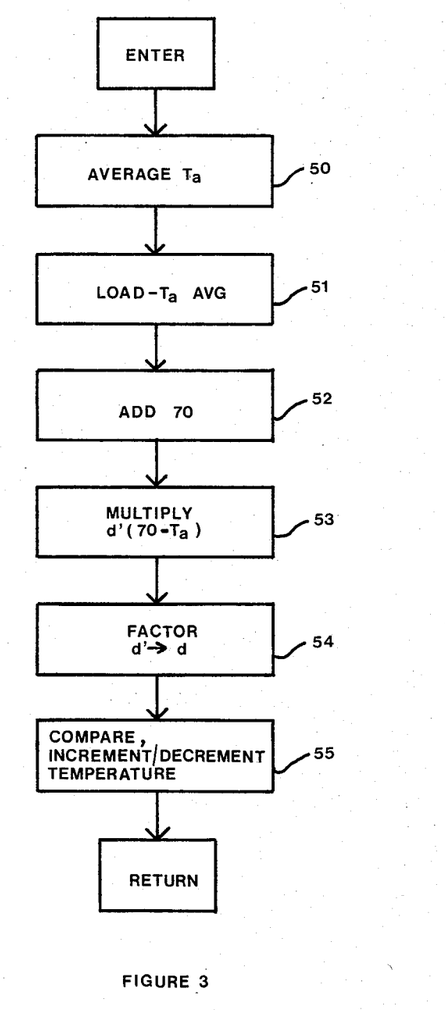
FIG. 3 is a flow chart of the process for computing the required temperature of the fluid heating medium.

The Heating Temperature Computation Function (40) computes the proper heating system fluid temperature based on the temperature external to the structure being heated and the parameter d, in accordance with the following equation:

$$T_f = (1+d)70 - dT_a, \text{ degrees F.}$$

where $T_f$ is the required heating system fluid temperature, and $T_a$ is the external (or ambient) temperature. A desired temperature inside the structure of 70° F. is assumed. The parameter d depends on many factors that determine the heating requirements of the structure, and is adjusted by the Automatic Parameter Adjustment Function to provide optimum energy efficiency. A flow chart is shown in FIG. 3. Several readings are taken of the external ambient temperature ($T_a$) and averaged (50), since this may be a noisy input line, depending on the distance to the sensor. This averaged value, along with the current value of the operating parameter, d, are used to compute the appropriate heating system temperature ($T_f$) for the ambient conditions (51 thru 54). This number is compared to the current stored value of $T_f$. The current value is incremented or decremented by only one LSB depending on whether the new number is higher or lower (55). The increment/decrement operation is used to smooth out errors and prevent wild variations on the output data lines due to a faulty measurement. Since this function is scheduled approximately once every 20 seconds, it will not have any problem keeping up with changes in the environment.

Figure 4:
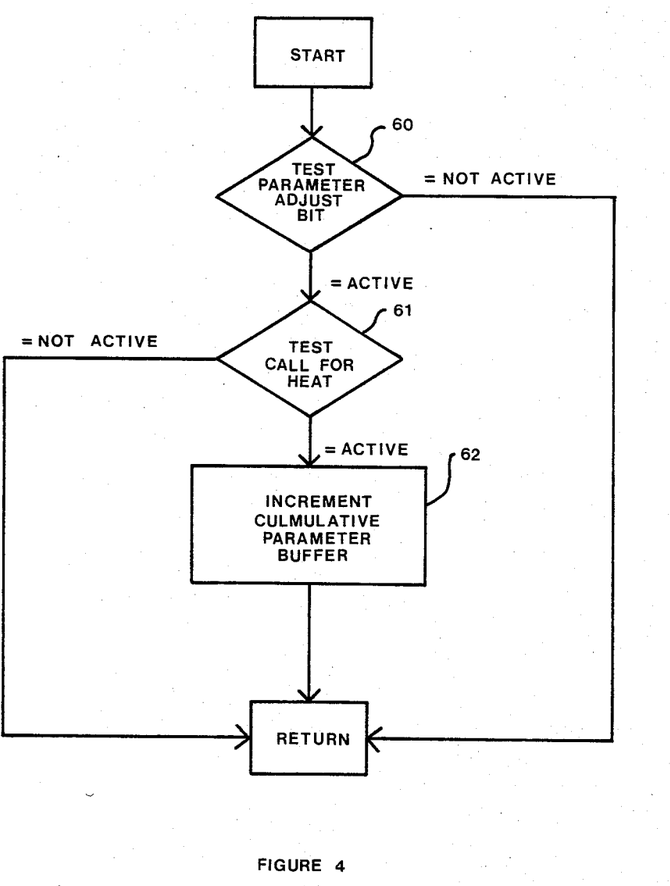
FIG. 4 is a flow chart of one of the subroutines within the Automatic Parameter Adjustment Function, which measures the percentage of time that the Call for Heat signal is active.
Figure 5:
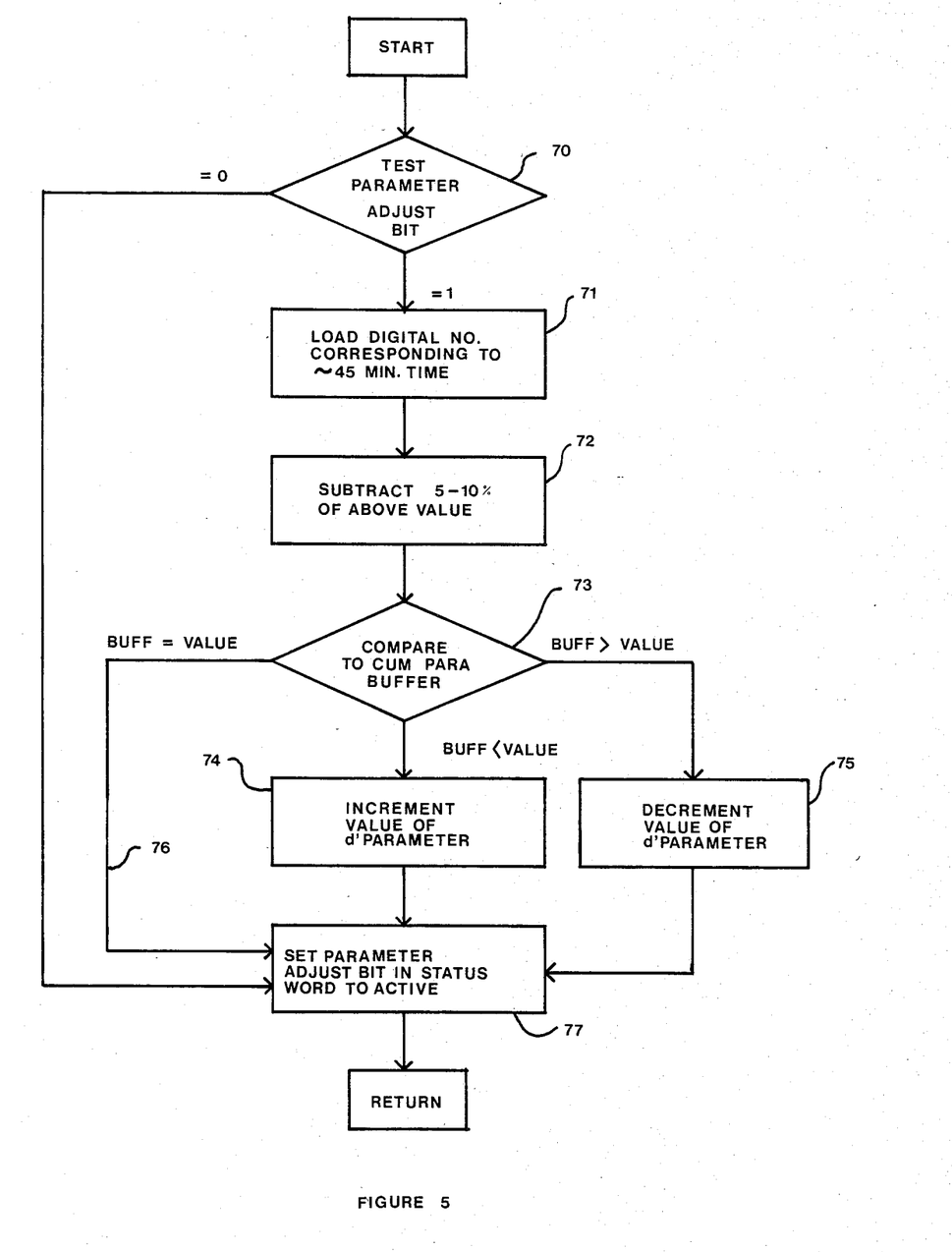
FIG. 5 is a flow chart of one of the subroutines within the Automatic Parameter Adjustment Function, which determines the change required to the parameter, d.
Figure 6:
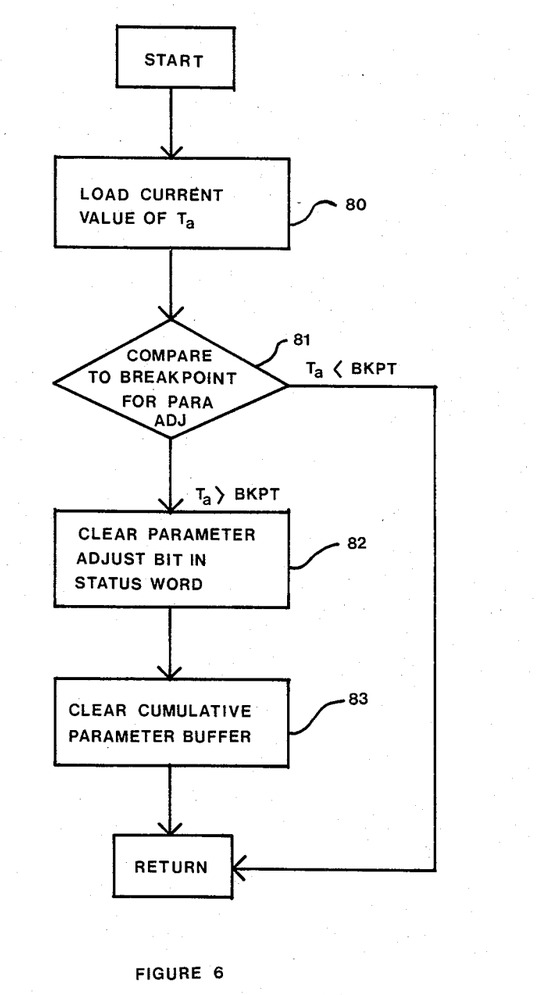
FIG. 6 is a flow chart of one of the subroutines within the Automatic Parameter Adjustment Function, which determines if said Function should be active based on the external temperature, and, FIG. 7 is a timing flow diagram showing how each of the software functions is timed and controlled by the Executive Function.

The unique parameter adjustment process is implemented in the software as the Automatic Parameter Adjustment Function. Three separate subroutines constitute this function, as shown in FIGS. 4, 5 and 6. The subroutine in FIG. 4 is a process whereby the percentage of time that the thermostat of the associated heating system has a Call for Heat signal active is measured. This signal is input directly to the microcomputer at one of its I/O ports. This subroutine is called by the Executive function at a fairly rapid rate, every 81.9 msec. First, the subroutine tests a status bit to see if the Parameter Adjustment Function is active. If not, this process is skipped. This status bit is controlled by another subroutine, shown below in FIG. 6. If the status bit is in the active state, then the Call for Heat indicator is tested (61). If said indicator is not active, then the subroutine is exited. If said indicator is active, then a cumulative buffer is incremented (62). This buffer is maintained until it is used by the next subroutine, which computes the correction required for the parameter.

The said next subroutine is shown in FIG. 5. This subroutine is called approximately once every 45 minutes by the Executive function. The same status bit as tested by the subroutine diagrammed in FIG. 4 is tested by this subroutine. The same process previously specified is used here, except that if the status bit is inactive, then this subroutine sets the bit to active before returning to the Executive (70,77). This serves as a periodic restart in case the process is stopped by some other function. If the status bit indicates that the Parameter Adjustment Function is active, then a number corresponding to approximately 45 minutes time, obtained from the Executive's current time count, is loaded, 5-10% of that value is subtracted from itself, and that number is compared to the value currently in the Cumulative Parameter Buffer (71,72,73). This operation is actually comparing the percentage of time that the Call for Heat is active to a 90-95% reference by counting the number of 81.9 msec time intervals that said Call for Heat was active over a specific time interval, and comparing it to a like count of time intervals corresponding to 90-95% of the same specific time interval. Based on this comparison, the parameter used in the said equation to compute the required temperature of the heating system fluid, $T_f$, is either incremented, decremented, or not changed (74,75,76). No matter what the action taken, the status bit is again set to active to ensure that the Parameter Adjustment Function is kept active (77).

The last subroutine used in the Automatic Parameter Adjustment Function is shown in FIG. 6. This subroutine is called by the Executive function approximately every 21 seconds. The subroutine accesses the current value measured for the external ambient temperature, $T_a$, and compares it to a breakpoint selected in the program, say, 50° F. (80,81). If $T_a$ is lower than said breakpoint, then the subroutine is exited. If $T_a$ is greater (warmer) than the breakpoint, then the status bit used in the previous two subroutines within the Automatic Parameter Adjustment Function is cleared to indicate that the said function is inactive (82), and the Cumulative Parameter Buffer, used by the subroutine diagrammed in FIG. 4, is cleared to allow the process to start over again should Ta subsequently decrease (83). This subroutine prevents the Parameter Adjustment Function from operating when the external temperature is relatively high, possibly providing inaccurate results.

Figure 7:
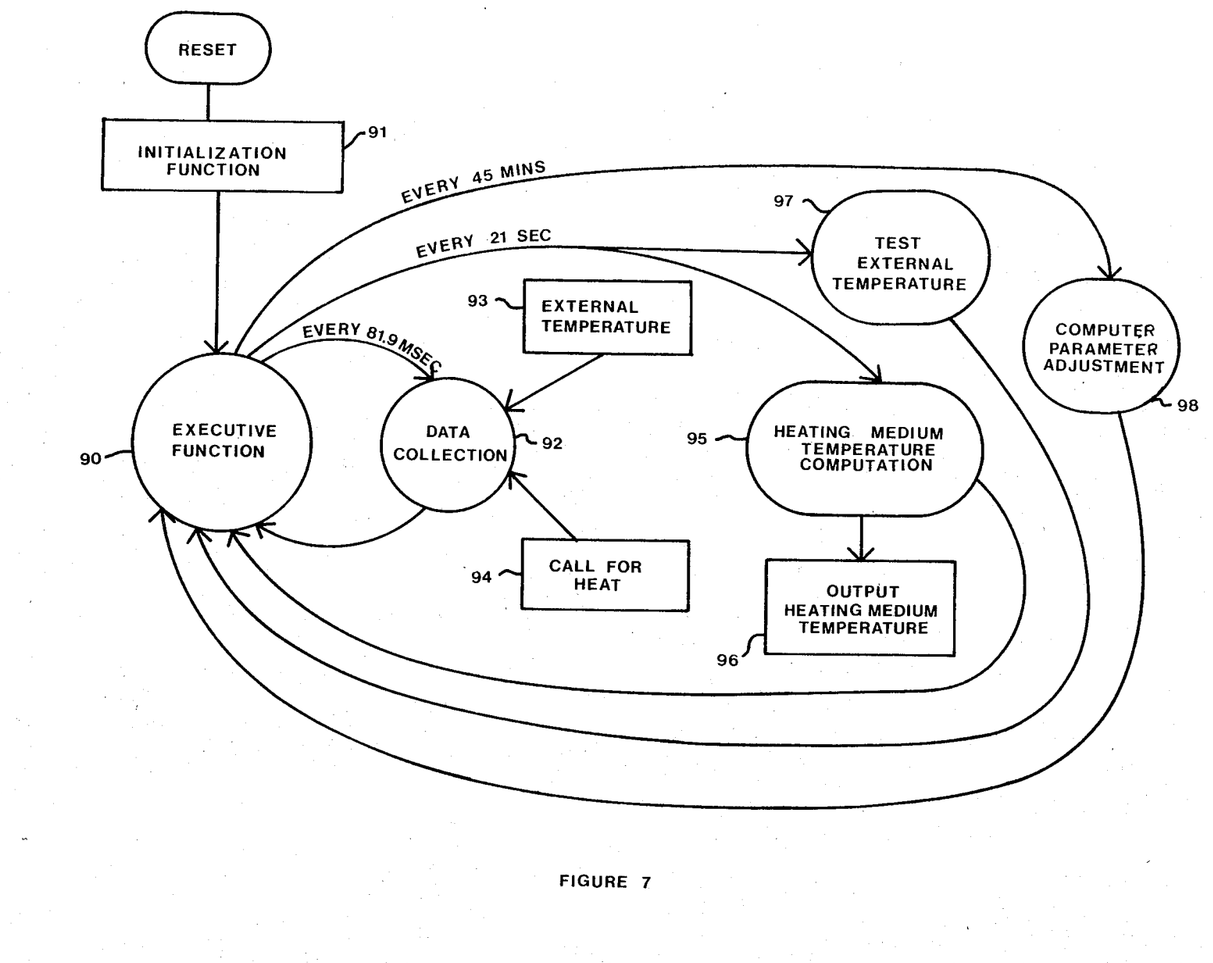

The chart in FIG. 7 shows how all the software functions discussed above are controlled and timed by the Executive Function (90). Following Reset, Initialization (91) is performed. Thereafter, the system remains under the control of the Executive which performs the various functions as scheduled. Every 81.9 msec (the basic increment of the Executive timer), readings are taken of the external temperature, Ta, and the state of the Call for Heat signal is tested (92,93,94), as discussed above for the process in FIG. 4. Every 21 seconds, the required heating fluid temperature is computed (95), and the required change, if any, is output to the device interfacing the invention to the heating system (96), as discussed above for the process in FIG. 3. Also every 21 seconds, the external temperature is tested to determine if the Automatic Parameter Adjustment Function should be performed or not (97), as discussed above for the process in FIG. 6. Every 45 minutes, a computation is performed to determine the required change to the parameter, d, which determines the relationship between the external temperature and the heating system fluid temperature (98), as discussed above for the process in FIG. 5.

I claim:

1. An apparatus for controlling the operation of a heating system, said heating system being for the purpose of maintaining the temperature of a structure at a selected value, said heating system consisting of a central heat source, a temperature sensing thermostat used to control the operation of said heat source by sensing the internal temperature of the structure being heated, heat radiating elements distributed throughout said structure, and a fluid heating medium capable of existing in a useful form over a wide temperature range, said medium being used to distribute the heat from said central heat source to said heat radiating elements, said apparatus comprising:

means for measuring the temperature external to said structure being heated;

means for measuring the percentage of time that a heating system control signal is in a state indicating that heat is required to maintain said structure at the desired temperature level, said control signal typically being generated by the said heating system's temperature sensing thermostat;

a closed-loop process for setting the temperature of said fluid heating medium to the minimum, and also most efficient, value possible with the current conditions external to said structure being heated, said process comprising:

first function for periodically determining the change, if any, required in the current value of the temperature of said fluid heating medium, based on the said measured temperature external to said structure, and an operating parameter, and modifying said value as required, and second function for periodically determining the change, if any, required in the current value of said operating parameter, based on said measurement of the percentage of time that the heating system control signal is in a state indicating that heat is required, compared to a reference percentage, and modifying said value as required, the closed loop nature of said process being caused by the fact that the said measurement of the heating control signal is itself affected by the said temperature of the fluid heating medium; and means for controlling the said heat source of the heating system to obtain the temperature of said fluid heating medium as determined by said closed-loop process.

2. An apparatus as set forth in claim 1, which incorporates a microprocessor or microcomputer system, including an appropriate software program, for performing the various control and processing operations required for the apparatus, including said closed-loop process and other functions necessary to interface signals used in said process to said microprocessor or microcomputer.

3. An apparatus as set forth in claim 2, which incorporates a means for performing a built-in test operation, including both hardware and software elements.

4. An apparatus as set forth in claim 2, which incorporates a device separate from the said microprocessor or microcomputer that monitors the activity of said microcomputer by requiring a periodic signal from said microcomputer, said device causing a reset of said microcomputer should said periodic signal fail to be received for more than a certain interval of time.

5. An apparatus as set forth in claim 3, which incorporates a device separate from the said microprocessor or microcomputer that monitors the activity of said microcomputer by requiring a periodic signal from said microcomputer, said device causing a reset of said microcomputer should said periodic signal fail to be received for more than a certain interval of time.

6. A heating system for the purpose of maintaining the temperature of a structure at a selected value, consisting of a central heat source, a temperature sensing thermostat used to control the operation of said heat source by sensing the internal temperature of the structure being heated, heat radiating elements distributed throughout said structure, and a fluid heating medium capable of existing in a useful form over a wide temperature range, said medium being used to distribute the heat from said central heat source to said heat radiating elements, and an apparatus for controlling the operation of said heating system comprising:

means for measuring the temperature external to said structure being heated;

means for measuring the percentage of time that a heating system control signal is in a state indicating that heat is required to maintain said structure at the desired temperature level, said control signal typically being generated by the said heating system's temperature sensing thermostat;

a closed-loop process for setting the temperature of said fluid heating medium to the minimum, and also most efficient, value possible with the current conditions external to said structure being heated, said process comprising:

first function for periodically determining the change, if any, required in the current value of the temperature of said fluid heating medium, based on the said measured temperature external to said structure, and an operating parameter, and modifying said value as required, and second function for periodically determining the change, if any, required in the current value of said operating parameter, based on said measurement of the percentage of time that the heating system control signal is in a state indicating that heat is required, compared to a reference percentage, and modifying said value as required, the closed loop nature of said process being caused by the fact that the said measurement of the heating control signal is itself affected by the said temperature of the fluid heating medium; and means for controlling the said heat source of the heating system to obtain the temperature of said fluid heating medium as determined by said closed-loop process.

7. A heating system as set forth in claim 6, said apparatus for controlling the operation of the heating system incorporating a microprocessor or microcomputer system, including an appropriate software program, for performing the various control and processing operations required for the apparatus, including said closed-loop process and other functions necessary to interface signals used in said process to said microprocessor or microcomputer.

8. A heating system as set forth in claim 7, said apparatus for controlling the operation of the heating system incorporating a means for performing a built-in test operation, including both hardware and software elements.

9. A heating system as set forth in claim 7, said apparatus for controlling the operation of the heating system incorporating a device separate from the said microprocessor or microcomputer that monitors the activity of said microcomputer by requiring a periodic signal from said microcomputer, said device causing a reset of said microcomputer should said periodic signal fail to be received for more than a certain interval of time.

10. A heating system as set forth in claim 8, said apparatus for controlling the operation of the heating system incorporating a device separate from the said microprocessor or microcomputer that monitors the activity of said microcomputer by requiring a periodic signal from said microcomputer, said device causing a reset of said microcomputer should said periodic signal fail to be received for more than a certain interval of time.

* * * * *